United States Patent [19]

Morris

[11] 4,307,842
[45] Dec. 29, 1981

[54] NOZZLE PARTICULARLY FOR LASERS

[75] Inventor: Donald H. Morris, Agoura, Calif.

[73] Assignee: Rockwell International Corporation, El Segundo, Calif.

[21] Appl. No.: 82,367

[22] Filed: Oct. 5, 1979

[51] Int. Cl.³ ............................................. H01S 3/00
[52] U.S. Cl. .................................. 239/557; 239/559; 239/567; 239/568; 331/94.5 D; 331/94.5 P
[58] Field of Search ..................... 331/94.5 D, 94.5 P; 239/556–559, 567, 568, 398, 429, 430

[56] References Cited

U.S. PATENT DOCUMENTS

| | | | |
|---|---|---|---|
| 3,192,989 | 7/1965 | Miller | 239/559 |
| 3,301,311 | 1/1967 | Stohrer | 239/567 |
| 3,404,845 | 10/1968 | Schmeling | 239/568 X |
| 3,826,432 | 7/1974 | Wang | 239/567 X |
| 4,048,586 | 9/1977 | Witte | 331/94.5 D |
| 4,097,820 | 6/1978 | Hill | 331/94.5 D X |
| 4,206,429 | 6/1980 | Pinsley | 331/94.5 P |

Primary Examiner—Richard A. Schacher
Attorney, Agent, or Firm—H. F. Hamann; H. B. Field

[57] ABSTRACT

A plurality of arcuate, secondary (fuel) nozzle members are juxtaposed, so that respective two of them define between them a curved, primary slit nozzle, producing a primary (oxidizer) expansion flow while the two flows mix downstream, predominantly transversely to the expansion. The nozzle members are mounted in the aperture of a plate; large-scale assemblies are described.

24 Claims, 5 Drawing Figures

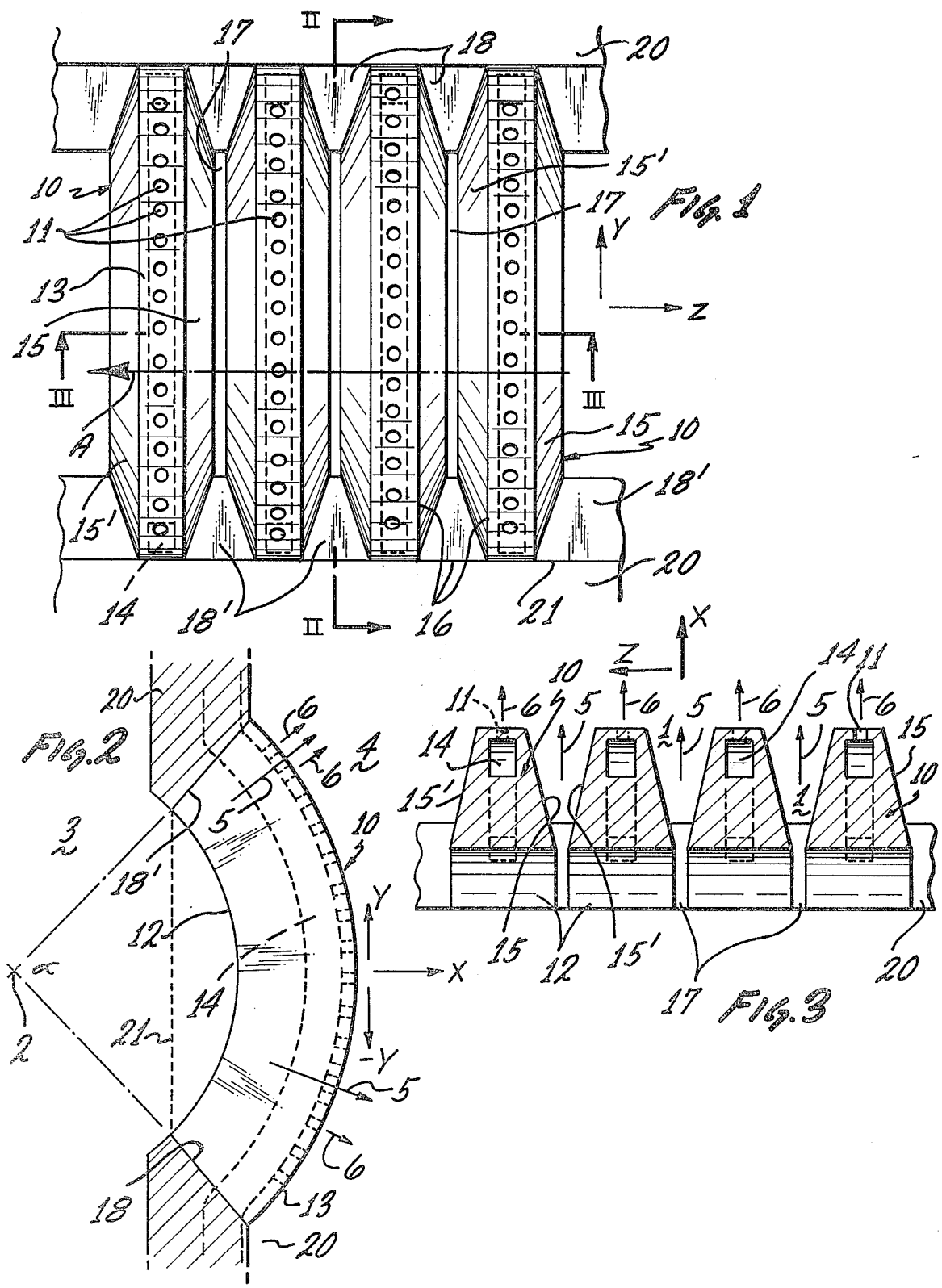

NOZZLE PARTICULARLY FOR LASERS

BACKGROUND OF THE INVENTION

The present invention relates to the construction of nozzles for combining two gases and, more particulary, the invention relates to the construction of nozzles by means of which different gases are injected and charged into the optical cavity of a chemical laser.

A chemical laser is, for example, constructed to have two major sections. In one section, a preparatory reaction takes place, including, for example an in situ thermal dissociation of molecules in order to obtain a certain quantity of atoms, e.g., of a halogen such as fluorine. The gaseous substance as prepared in this chamber is commonly referred to as the oxidizer or primary fluid. The nature of the preparation of the oxidizer involves raising its temperature and pressure, and the preparation process is in some cases a combustion, so that the chamber, in which this process takes place, is called a combustion chamber. The other section includes the optical cavity as well as optical outputcoupling devices, etc., for the laser. The optical cavity of the chemical laser receives the oxidizer as well as fuel. The reaction in the optical cavity between the fuel and the oxidizer produces a laser-active medium.

The two sections are, so to speak, interconnected by means of a nozzle structure, causing the oxidizer, as developed in the reaction chamber of the first section, to be mixed with fuel gas and, possibly, others to obtain the requisite temperature and population inversion in the optical cavity by means of a chemical reaction or reactions as between oxidizer and fuel. A common chemical laser involves fluorine, and the combustion causes dissociation of a substantial amount of fluorine molecules into fluorine atoms, serving as the oxidizer proper. A mixture of atomic and molecular fluorine together with residue of the combustion process as well as e.g. helium or nitrogen as a diluent is charged into the optical cavity by means of a primary nozzle or nozzles; commonly, hydrogen or deuterium is used as fuel and is charged through secondary nozzles into the optical cavity, to mix and react with the oxidizer.

Two major events occur and are established by such a dualcharge process of the optical cavity: (a) the primary nozzle establishes supersonic flow of the oxidizer into the cavity under conditions of flow expansion in order to obtain the requisite thermodynamic conditions for the subsequent chemical laser action; and (b) the oxidizer and fuel gases, being separately discharged by the primary and secondary nozzle structure into the laser cavity, must mix intimately. These two requirements must not only be compatible, but (i) the several gases, as they are mixed, must have the requisite stoichiometric proportion in the instant the thermodynamic conditions are "right" for the chemical reaction and for the lasting action; and (ii) these composite conditions must concur over a fairly large zone in the laser cavity, simply to obtain a high optical power yield.

It is believed that the known nozzles and nozzle structure are deficient in performance, ultimately, as far as the condition and requirement (ii) is concerned. The expanding flow of the oxidizer, as it meets the fuel, will, of course, establish the correct combination of parameters for laser action at some point in the optical cavity, even if the operating conditions vary over a wide range. However, that alone is clearly insufficient. One needs a large zone (volume) filled with a laser-active substance in order to obtain an optical power yield commensurate with the effort expanded for establishing the various conditions, including a large rate of dissociation for obtaining a large quantity of oxidizers, which, of course, should be used and used up to the fullest extent possible.

Another drawback of the prior art nozzles for charging the optical cavity is the need for adding extensive quantities of dilutents (e.g., helium) to the oxidizer in order to match the thermodynamic conditions of the combustion products with the thermodynamic requirements in the laser cavity. The prior art nozzles through which the oxidizer is discharged from the combustion chamber are further disadvantages by their structure. These nozzles project into the combustion chamber to a considerable extent, thus offering a relatively large surface for the influx of heat which has to be removed. Extensive internal cooling of the nozzles, however, extracts heat from the combustion chamber which is thus removed therefrom and "wasted."

DESCRIPTION OF THE INVENTION

It is an object of the present invention to provide a new and improved nozzle structure for combining two gases.

It is an object of the present invention to provide a new and improved nozzle and nozzle structure in which the resulting thermodynamic and gas flow dynamic conditions at the exit side of such a nozzle or nozzle structure are better matched to the requirements pertaining to the mixing of a fuel and of an oxidizer, and vice versa.

It is still another object of the present invention to provide a new and improved nozzle structure for charging a chemical laser.

It is a further object of the present invention to reduce the need for a diluent in an oxidizer being charged into an optical laser cavity of a chemical laser by means of nozzle structure.

It is still a further object of the present invention to improve the thermodynamic conditions in the interface between a combustion chamber and an oxidizer nozzle for a chemical laser.

I have discovered that a major reason for the deficiencies in the prior art nozzle structures is to be seen in the fact that the expansion of the oxidizer flow and the mixing of oxidizer and fuel are carried out in the same directions. It is, therefore, a principal feature of the present invention to provide for a (primary) flow expansive of the oxidizer in one direction in the laser cavity and to provide for mixing of the expanding oxidizer with the fuel in an angular direction.

It is, therefore, a specific object of the present invention to provide a new and improved nozzle structure to be interposed between a chamber in which the oxidizer is prepared (e.b., by combustion), and an optical cavity for a chemical laser, wherein the nozzle structure realizes the aforesaid principal feature.

In accordance with the preferred embodiment of the present invention and pursuant to the specific object as stated, it is suggested to position a plurality of arcuate and tapered nozzle elements next to each other to define a plurality of arcuate nozzle slits, each one serving as a throat for producing an expanded primary flow of oxidizer into the optical cavity; the expansion is to occur in planes traversing the respective slits lengthwise. The concave rear boundaries of the juxtaposed elements face the combustion chamber; and these elements themselves include apertures for discharging fuel in a direction parallel to the planes, for obtaining mixing of the fuel with the primary flow of the oxidizer in an angular direction to the planes and to the fanned-out primary flow field of the oxidizer stream. As a consequence, a low pressure is obtained and maintained during the mixing process in the optical cavity in order to obtain, ultimately, a large region filled with a laser-active medium. Moreover, this low pressure is maintained approximately constant in a controlled manner because variations in the primary flow onto or in the laser chamber are largely offset by variations in the exothermic reaction thereon, so that the two resulting but opposing pressure changes balance each other to a substantial degree.

The amount of diluent needed is comparatively low, considerably less than half of what has been deemed necessary previously. Also, the nozzle structure does not have portions projecting into the combustion chamber, but interfaces therewith with a minimum surface area, so that cooling the nozzle elements can be reduced or even dispensed with entirely.

The preferred embodiment of the invention, the objects and features of the invention, and further objects, features and advantages thereof will be better understood from the following description taken in connection with the accompanying drawings.

DESCRIPTION OF THE DRAWINGS

FIG. 1 is a front elevation of a portion of a nozzle construction in accordance with the preferred embodiment;

FIGS. 2 and 3 are respectively enlarged section views taken along lines II—II and III—III in FIG. 1, wherein FIG. 2 is drawn in the X–Y plane and FIG. 3 is drawn in the X–Z plane of a three-dimensional coordinate system.

Proceeding now to the detailed description of the drawings, FIGS. 1, 2, and 3, illustrate a plurality of primary nozzles 1, separated by particularly shaped elements, 10, which provide secondary nozzles 11. The nozzle elements, 10, are mounted in a frame 20 and are in this fashion interposed between a combustion chamber 3 and an optical laser cavity 4. Neither chamber 3 nor cavity 4 are depicted in great detail because they are conventional. Briefly, and by way of example, oxidizer gas for the chemical laser operation is prepared in chamber 3 in that combustion produces the requisite heat to dissociate, e.g., $F_2$ into $2F$. The optical cavity, 4, includes the usual reflectors and optical output coupler structure. The nozzle structure charges the optical cavity with oxidizer and fuel.

Figure 4:
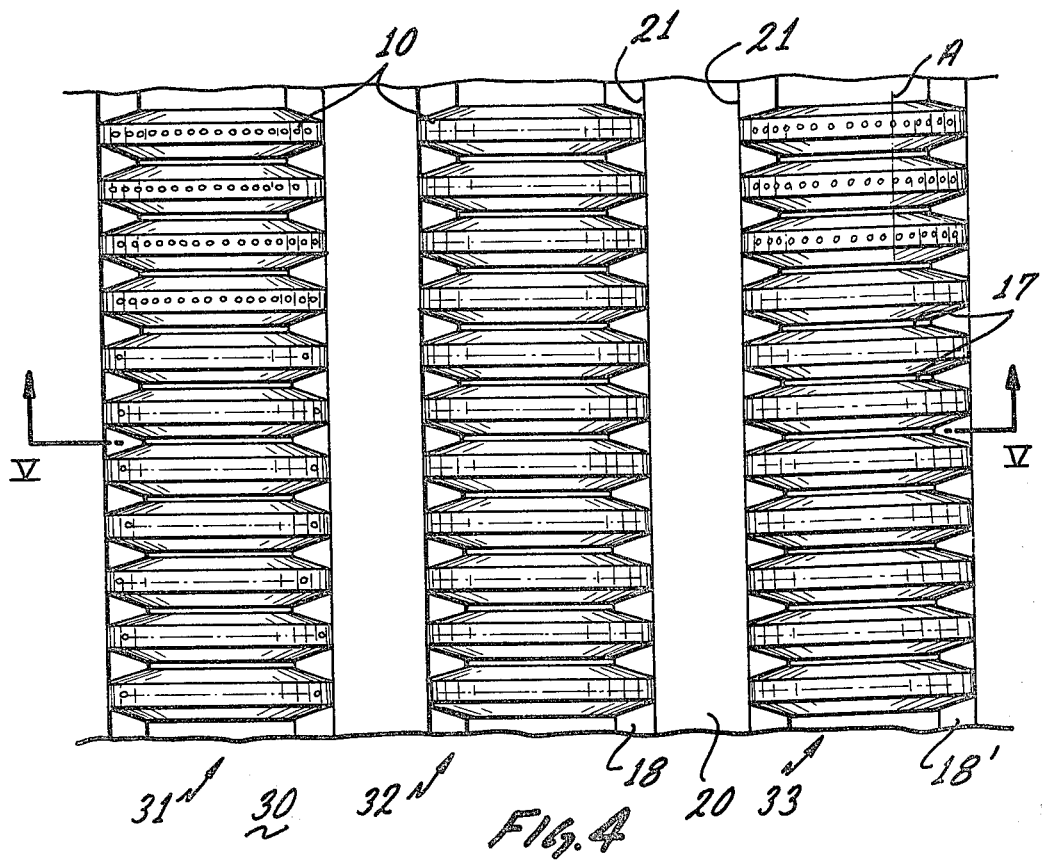
FIG. 4 is a plan view of a nozzle array, in which many nozzles of the type shown in FIGS. 1, 2, and 3 are combined.

The elements 10 are of arcuate configuration, i.e., they are constructed as ring sections, each covering a particular angular range $\alpha$ at a particular curvature. These elements are, for example, of a trapezoidal cross section in order to obtain a relatively wide cylindrical base surface 12 and a rather narrow, cylindrical tip surface 13 for the secondary nozzle openings 11. Side walls 15 and 15' are shown to be planar, but they could be contoured to obtain a particular fan-out of the jet in the Z-direction.

The individual nozzle openings 11 in any of the elements 10 extend radially outwardly from a manifold duct 14 of correspondingly arcuate construction and, for example, rectangular cross section. The cross section of the manifold is not of any great significance and will be dictated primarily by considerations of manufacturing.

Respective two adjacent walls (15, 15'), but pertaining to two juxtaposed elements, established a single primary nozzle 1. The exit openings 16 of such nozzle 1 is established by the facing edges of the two tip surfaces 13 of these two elements 10. The entrance opening and throat of the primary nozzle 1 is an arcuate slit 17 as between the two base surfaces 12 of the two juxtaposed nozzle elements 10.

Most significantly, the exit openings and entrance slits of the primary nozzles are all concentrically curved. The geometric center here is axis 2 of the cylinder as defined by the aligned concave base surface 12 as well as by the correspondingly aligned tip surfaces 13. This curved arrangement by and of the nozzle entrances and exits is supplemented for each primary nozzle 1 by means of end walls 18 and 18', which are oriented at angle $a$ to each other, corresponding to the ring segment configuration of each nozzle element 10.

These end walls 18 and 18' actually pertain to the mounting structure or frame 20, in which the nozzle elements 10 are mounted. In particular, frame 20 (being, for example, a plate) has a rectangular opening 21 of which two opposite side walls are tapered sides, or side walls 18 and 18', respectively. The nozzle elements 10 are disposed and inserted into this rectangular opening at a spacing of their basis, corresponding to slits 17. Due to the tapering of element walls 15 and 15', wedge-shaped portions of the walls 18 and 18' are left exposed. These exposed portions of walls 18 and 18' become primary nozzle boundaries of like designation.

FIGS. 1, 2, and 3 show also an X–Y–Z orthogonal coordinate system used here to better explain the directions and orientations involved. The primary nozzles discharge an oxidizer from reaction chamber 3 into laser cavity 4, and that direction is designated by coordinate X, identifying the average direction of the primary nozzle discharge flow filed. Due to the curvature of nozzles 1 in the X–Y planes, the primary flow is fanned out, which means that flow vectors 5 of the oxidizer have flow components in the +Y or in the −Y directions, depending upon how close the flow is to one or the other of the nozzle boundaries 18 and 18'.

The primary flow, as identified by vectors 5, is a true source flow, the axis 2 being the (geometric) source or line of origin of such a flow. The principal expansion of the flow occurs in the X–Y planes and determines the thermodynamic conditions of the gas in the optical cavity. In the case of a fluorine-hydrogen laser (the oxidizer being atomic fluorine), the temperature of the flow may drop from about 1200° K. in reactor chamber 3 to about room temperature in laser cavity 4. Moreover, proper selection of the curvature and of the (radial) length of the nozzle permits a substantial reduction in the amount of the diluent. The diluent is usually deemed necessary to obtain a particular combination of thermodynamic conditions in the laser cavity. Presently, the nozzle dimensions are well suited to cut that need at least in half, or even less. Elements 10, which have been constructed and successfully used, had a radius of curvature of their surface 13 of a little less than 1 inch, others has a radius of 1 centimeter. FIGS. 1, 2, and 3 are, therefore, enlarged views of such elements. There is no reason to assume that such elements cannot be made with a larger or smaller radius of curvature.

As can be seen from FIG. 3, a moderate, secondary fan-out occurs in the X-Z plane on account of the taper of walls 15 and 15'. The thermodynamic effect of this secondary fan-out is correspondingly of a secondary nature. It is, however, highly instrumental in the mixing process.

A close inspection of FIG. 2 reveals that the outward taper of nozzle walls 18 and 18' diverges wider than the radial flow field thereof. The reason for this is to compensate the effect of boundary layers adjacent to and alongside these walls 18 and 18'. These boundary layers grow in thickness in the direction of flow, so that the undisturbed flow on top of the boundary layers has, indeed, the desired radial direction based upon the overall geometry.

As stated, $H_2$ or $D_2$, or a mixture thereof, for example, is discharged as a fuel through the round nozzle openings 11 in each one of the elements 10, producing the secondary flow of the system. These openings direct, individually, conical jets in different directions, corresponding to the arcuate configuration of elements 10. The average or mean flow direction, as emerging from (the center of) each nozzle 11, can be defined by a vector 6, being normal to the surface 13 of element 10. This flow vector 6 runs parallel to flow vector 5 of the adjacent primary flow.

The conical jets, emerging from openings 11, quickly merge with the primary flow as expanded in the Z-direction. The conical jets from the individual nozzles 11 expand also in the Z-direction to merge in and mix with the gas from primary nozzles 1. The expansion of either flow in the Z-direction is primarily responsible for the mixing processes, but is a secondary phenomenon as far as the thermodynamics are concerned.

It can readily be seen that the expansion of the primary gas flow and the mixing processes of primary and secondary flows, i.e., of oxidizer and fuel, are decoupled and made independant from each other to a large degree. The curvature of the primary nozzle and of the arcuate elements 10 in the X-Y plane determines the flow expansion. The spacing between nozzle elements 10, the taper of walls 15 and 15', and the size of openings (11 and 17), involved in relation to each other and in further relation to their mutual spacing in the Z-direction, determine the mixing. Thus, the degree of mixing and the temperature and pressure conditions in the laser cavity can be matched through independent selection, design, and adjustment of the construction parameters of nozzle elements 10 and their assembly.

It should be realized that the inventive nozzle structure establishes a low pressure in the laser cavity, 4, which pressure is dynamically maintained approximately constant in a controlled fashion. The reason for this is not immediately apparent. The diverging, i.e., expanding flow field as produced by nozzles 1 would produce a pressure field which decreases with its distance from the curved exit plane of the primary nozzles, in the X-direction. Moreover, that pressure may vary whenever the velocity of the oxidizer changes. However, the chemical reaction in laser cavity 4 is an exothermic one and increases in intensity with its distance from the nozzle plane on account of an increase in the state of mixing. Furthermore, an increase in influx of reactants tends to increase the temperature. Consequently, the flow dynamic conditions downstream from primary nozzles 1 combine with a thermodunamic effect of the chemical reaction, so that the low pressure in the laser chamber actually stays approximately constant under controlled conditions, and the zone of such a near-constant pressure extends for a considerable distance, from the nozzles, into laser cavity 4.

FIG. 1 et seq show the preferred nozzle structure for the mixing component which is to be added (e.g., hydrogen). This structure includes a plurality of openings 11 in each element 10. One could, of course, provide also a narrow slot, or a few oblong slots. However, manufacturing is simpler if the secondary nozzles are made by drilling plural, individual apertures. Moreover, individual apertures are preferred as the total aperture area can be more readily preadjusted and selected through proper choice of spacing, number, and size of small holes. In conjunction therewith, FIG. 1 shows a specific feature in that the rows of apertures 11 in juxtaposed elements 10 are staggered. Take a ray A of laser beam lights, traversing the optical cavity at a distance not too far from the nozzle exit planes: that ray will directly traverse the jet cone from some of the secondary nozzles 11, but will pass in between respective two of such flow cones at other elements. Thus, the staggering prevents that some beams traverse a secondary jet of each nozzle element while another, parallel running beam passes always in between such jets. The staggering, thus, provides for an averaging effect along beams of light as far as traversing not yet completely mixed gas components is concerned.

It will be observed that nozzle members 10 do not have any subsonic structure upstream of throats 17. A subsonic flow structure is not needed for a variety of reasons. As stated, the nozzle elements, 10, are inserted in a plate 20 which is a wall of the combustion chamber. In the past, the nozzle-defining structure itself constituted the support beams for that one wall of the combustion chamber, and the nozzles themselves had to take the entire pressure load of the combustion chamber acting on the wall. Presently, the beam support for this wall is defined by plate 20, and not by the curved elements 10. Therefore, the nozzle elements need to span just the width of an aperture in plate 20; they do not have to be as thick as the elements which, in the prior art structure, defined the secondary and, possibly also, the primary nozzles. Such a plate is shown in greater detail in FIGS. 4 and 5. The structure of plate 20, and here particularly the beam portions of the plate between the depicted columns of nozzle elements 10, support the nozzles and provide the entire beam structure for the wall.

Since the nozzle elements are not used as structural beams but span aperture 21 in plate 20 for a short distance only, they do not have to project into the combustion chamber. Thus, one can reduce that surface portion of the secondary nozzle elements which is exposed to a high thermal load from the combustion chamber. In fact, these particular nozzle elements as a whole offer only a minimum surface area for direct exposure to combustion chamber 3. This surface area is given by the concave bases 12 of all elements 10. It was found that this surface configuration establishes minimal heat transfer conditions from chamber 3 into the nozzle structure. Accordingly, it was found that internal cooling of the nozzle elements may not be needed. In some cases, some residual cooling may be advisable, but one does not require extensive cooling. Consequently, the combustion (or any other temperature-dependant reaction) in reactor chamber 3, in which the oxidizer is prepared, is not interfered with by creating strong heat sinks at or in the boundaries of that chamber.

Figure 5:
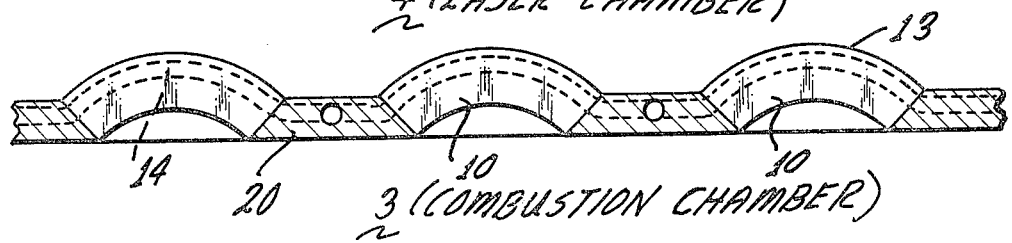
FIG. 5 is a section view as indicated by lines V—V in FIG. 4.

Turning now to FIGS. 4 and 5, this somewhat schematic illustration demonstrates that the principles involved in the nozzle structure lend themselves directly to large-scale expansion. FIGS. 1, 2, and 3 can be interpreted as showing a linear array of nozzles (in the Z-direction). Such linear arrays are identified by numerals 31, 32, and 33 in FIGS. 4 and 5; and these arrays, in turn, can be interpreted individually as elements in a larger array 30 of such elements. The support structure for this array is still frame 20, being a frame or support plate in the general sense as it is specifically provided to take up the pressure load from the reactor chamber. Also, this frame is available for manifolding. The regions in between such nozzle array elements constitute blank zones, but the wide fan-out of the nozzle causes the active zones in the flow field to merge fairly close to the wall and frame structure.

FIG. 4 illustrates in its right-hand portion a modification of nozzle elements 10 as mounted. In this instance, one does not need to stagger the apertures, 11, as shown in FIG. 1. Rather, the elements, 10, are mounted with a slight skew. Consequently, apertures 11 cannot be aligned in the A-direction of the laser beam propagation.

The invention is not limited to the embodiments described above, but all changes and modifications thereof not constituting departures from the spirit and scope of the invention are intended to be included.

I claim:

1. A nozzle structure for combining two gas components in a cavity comprising a plurality of first nozzle means for providing a diverging expansion flow of a first gas component into the cavity, the expansion occurring predominantly in a first direction, being angular to an average flow direction from each of the first nozzle means; and a plurality of second nozzle means respectively interposed between the nozzle means of the first plurality to provide a flow of the second component along the flow of the first component, so that mixing between the flows occurs predominantly in a second direction, being angular to said first direction and to said average flow direction.

2. The nozzle structure as in claim 1, said first nozzle means including means defining an arcuate slit, outwardly-tapered walls terminating in an exit plane being of concentrically arcuate configuration, the second nozzle means being in said exit plane.

3. The nozzle structure as in claim 1 or 2, the first nozzle means each being defined by two juxtaposed nozzle elements, containing also the nozzle means of the plurality of second means.

4. The nozzle structure as in claim 3, further including frame means defining a rectangular aperture, the elements being placed into the aperture.

5. The nozzle structure as in claim 3, the nozzle elements having each a plurality of openings defining the second nozzle means, and internal duct means for manifolding the openings of the plurality.

6. In a chemical laser, a nozzle construction, comprising:

a primary nozzle, having (i) an arcuate slit-like throat, (ii) two mutually inclined end walls respectively at two opposite ends of the slit-like throat, and (iii) side walls terminating radially outwardly from the slit-like throat in an arcuate exit plane being concentric to the slit-like throat, in order to obtain a supersonic, expanding primary flow in the nozzle and flow expansion downstream from the exit plane, the flow expanding predominantly in a plane traversing and being normal to the slit and to the curved exit plane; and secondary nozzle means in said exit plane and disposed alongside the primary nozzle means and directing secondary jet flow in different radially outward directions corresponding to the curvature of the arcuate exit plane, the primary and secondary jet flows mixing in directions transversely to said plane traversing the throat and the exit plane.

7. A nozzle construction as in claim 6, wherein the side walls are of tapered configuration.

8. In a chemical laser, a nozzle structure for mixing oxidizer and fuel, comprising:

primary nozzle means for providing an expansion flow of oxidizer in different directions; and secondary arcuate nozzle means, providing a flow of fuel also in the different directions and being positioned so that fuel and oxidizer mix in an expansion flow field of the oxidizer flow and predominantly in directions angular to said different directions, said primary and secondary nozzle means having a common, curved, cylindrically shaped exit plane.

9. In a laser as in claim 8, wherein the primary nozzle means includes at least one arcuate slit.

10. In a laser as in claim 8 or 9, said primary nozzle means including a plurality of primary nozzles arranged along said angular direction and separated by the secondary nozzle means.

11. In a laser as in claim 10, said secondary nozzle means including plural nozzle openings arranged in said exit plane along the arcuate curving thereof.

12. In a chemical laser, a separating construction between a first oxidizer preparation chamber and a second, optical laser cavity, comprising:

frame means defining at least one rectangular aperture;

a plurality of arcuate members inserted in the aperture in parallel, side-by side relationship, leaving nozzle slits in between, facing said first chamber, and establishing primary nozzles for directing supersonic oxidizer flow into the second chamber;

aperture means in the arcuate members defining fuel nozzles oriented in different directions on account of the arcuate configuration of the members, the arcuate members further including duct means for feeding the aperture means; and manifold means in the frame means for feeding the fuel to the duct means of the members.

13. In a laser as in claim 12, there being a plurality of such rectangular apertures, each one containing a plurality of such arcuate members.

14. In a laser as in claim 12, the aperture means being a plurality of openings in each one of the said members.

15. In a laser as in claim 14, wherein the apertures of adjacent ones of the members are misaligned in relation to an optical axis.

16. In a laser as in claim 12, said rectanglar aperture having at least in parts mutually inclined opposite sides defining outward tapering of each one of the primary nozzles.

17. In a laser as in claim 12, wherein each arcuate member has a cylindrically curved base surface, facing said first chamber, said base surfaces being axially aligned in a common cylindrical surface which includes also said slits.

18. In a chemical laser, a nozzle construction for feeding oxidizer and fuel into an optical laser cavity, the combination comprising:
   at least two arcuate members disposed for curving in two parallel planes and defining an expansion nozzle for the oxidizer, the expansion occurring predominantly in said planes; and
   aperture means in each one of the said members for the discharge of the fuel gas component also in and parallel to said planes, so that the fuel and oxidizer mix in directions normal to said planes.

19. In a laser as in claim 12 or 18, each one of the said members having a trapizoidal cross section.

20. In a chemical laser, a nozzle structure for combining oxidizer and fuel gases in an optical cavity in which the gases undergo a chemical reaction, comprising:
   a plurality of first nozzle means for providing a diverging expansion flow of an oxidizer into the cavity, the expansion occurring predominantly in a first direction, being angular to an average flow direction from each of the first nozzle means; and
   a plurality of second nozzle means respectively interposed between the nozzle means of the first plurality in order to provide the flow of a fuel gas along the flow of the ozidizer, so that mixing between the flows occurs predominantly in a second direction, being angular to said first direction and to said average flow direction.

21. The nozzzle structure as in claim 20, the first nozzle means each being defined by two juxtaposed, arcuate nozzle elements, containing also the nozzle means of the plurality of second means.

22. A nozzle structure for mixing two gases, comprising:
   primary nozzle means for providing an expansion flow of a first one of the gases, the expansion occurring in different directions; and
   secondary arcuate nozzle means, providing a flow of a second one of the gases also in different directions and being positioned, so that the two gases mix in an expansion flow field of the flow of the first gas and predominantly in directions angular to said different directions, said primary and secondary nozzle means having a common, curved, cylindrically shaped exit plane.

23. In a laser as in claim 22, wherein the primary nozzle nozzle means includes at least one arcuate slit.

24. In a laser as in claim 22 or 23, said primary nozzle means including a plurality of primary nozzles arranged along said angular direction and separated by the secondary nozzle means.

* * * * *